United States Patent Office 2,892,679
Patented June 30, 1959

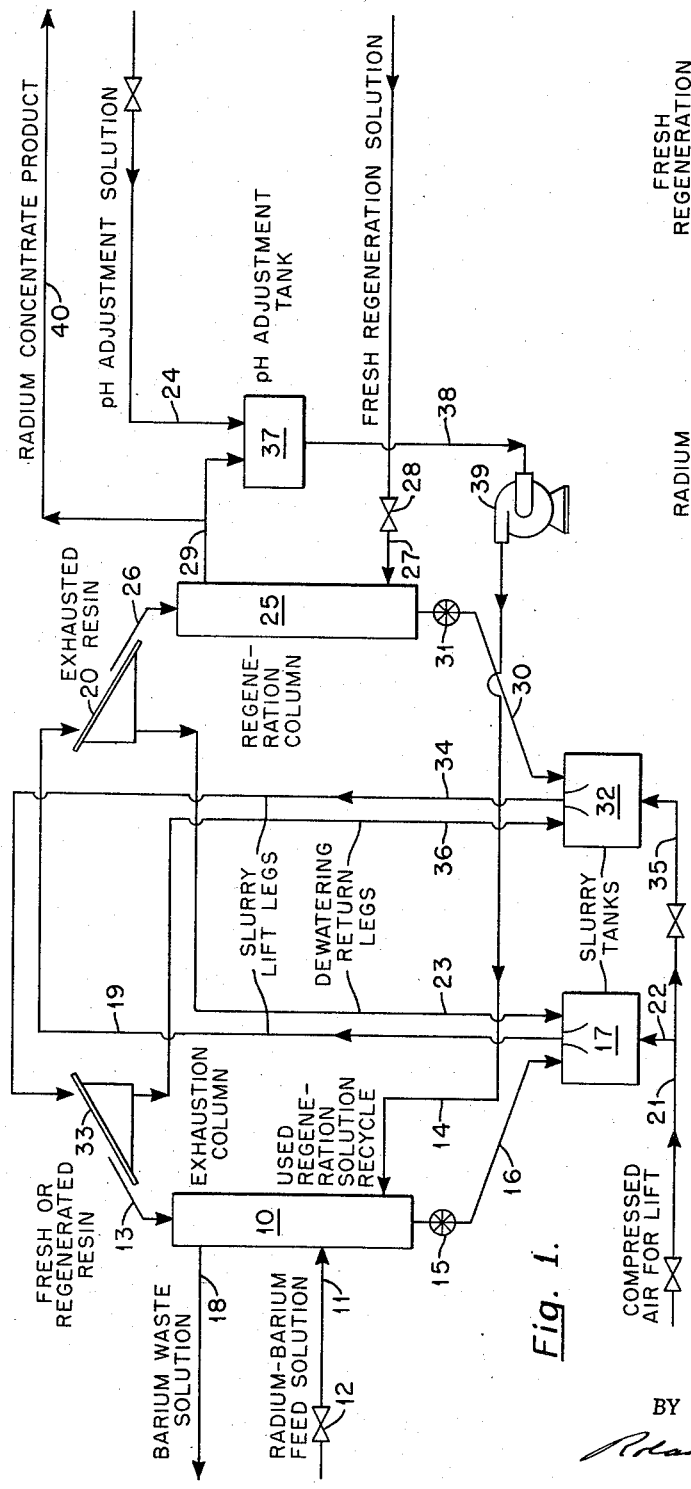
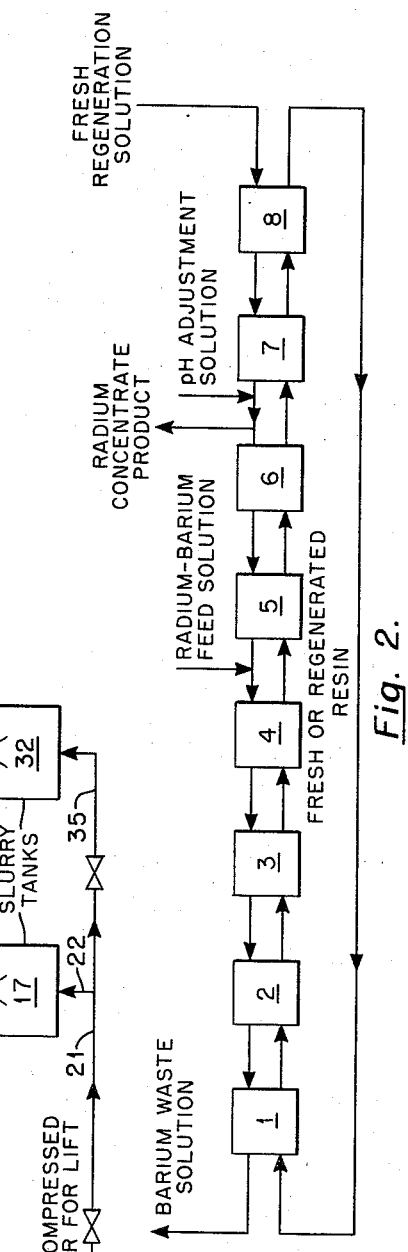
Fig. 1.
Fig. 2.
INVENTOR.
Manuel E. Fuentevilla
ATTORNEY

2,892,679

ION-EXCHANGE METHOD FOR SEPARATING RADIUM FROM RADIUM-BARIUM MIXTURES

Manuel E. Fuentevilla, Woodbury, N.J., assignor, by mesne assignments, to the United States of America as represented by the United States Atomic Energy Commission Application July 21, 1953, Serial No. 387,821

1 Claim. (Cl. 23—23)

The present invention relates in general to an ion-exchange type process for separating ionic materials from dilute mixtures, and more particularly to a continuous ion-exchange process for the separation of radium from radium-barium mixtures.

In the commercial production of radium salts from radium bearing ores, it is conventional practice to separate the radium ions from dilute aqueous solutions containing much larger amounts of barium ions. The weight ratio of barium to radium is usually about 200,000 to 1 and a further concentration of about 100,000 times is necessary before a commercially suitable product is obtained. Currently, radium salts are separated from barium salts by classical fractional crystallization methods. These methods have been used for decades and are very tedious and laborious because many crystallizations are required, and a considerable amount of recycling and handling is necessary.

Although the use of ion-exchange resins has been proposed in the past for the separation of radium ions from radium-barium ion mixtures, such methods were not developed to the point where they could complete commercially with the commercial fractional crystallization methods currently being used.

It is an object of the present invention to provide a commercially feasible ion-exchange type process for the separation of certain species of ionic materials from admixture with other ionic materials.

Another object of the invention is to provide a method for continuously and efficiently separating radium ions from admixture with other ionic materials by means of ion-exchange resins.

It is an additional object to provide a commercial process for continuously and efficiently separating radium ions from aqueous solutions of radium and barium ions by means of cation exchange resins.

Other objects will become apparent after reading the following description of the invention:

The expression "saturated resin" is used herein to indicate a resin which has reached substantial equilibrium with the ionic material in a solution in intimate contact with the resin.

In accordance with the present invention, ions of a particular desired class, such as radium ions for example, are separated from a liquid feed mixture containing the desired ions together with other ionic material, such as barium ions, for example, by feeding the mixture into preferably countercurrent contact with particles of an ion-exchange resin until at least a portion of the resin becomes exhausted or saturated with radium ions from the feed mixture. A portion of used regeneration liquid obtained from the regeneration of previously exhausted resin (as described later) and containing a higher radium ion concentration than the feed liquid is brought into contact, preferably countercurrent contact with the exhausted resin to cause the adsorption thereon of more radium ions until the resin is again saturated or exhausted relative to the used regeneration liquid. This latter contact operation places an additional amount of radium upon the resin beyond that obtainable by conventional adsorption procedures and causes a displacement from the resin of some of the adsorbed barium ions.

The contacted feed mixture obtained above, which is substantially free of radium, and the used regeneration liquid obtained from contacting the exhausted resin are withdrawn from the adsorption system.

Used resin is regenerated by bringing the resin contacted by the feed mixture and used regeneration liquids respectively, into preferably countercurrent contact with a fresh regeneration liquid which is usually of a lower or higher pH than the feed liquid. The used regeneration liquid obtained from this regeneration step is divided into two portions. One portion of this used regeneration liquid is separated from the system as the product which is rich in radium. This product liquid is substantially free of impurities such as barium ions. The pH value of the remaining portion of the used regeneration liquid is adjusted preferably to that of the feed liquid and is recirculated into preferably countercurrent contact with resin contacted by the feed mixture as stated near the beginning of this description. The regenerated resin is recirculated back to the starting point of the system into contact with the feed mixture.

A more detailed description of one embodiment of the method of the invention is given with reference to Figure 1 of the accompanying drawings, which diagrammatically illustrates a continuous system for separating radium ions from a feed solution containing both radium and barium ions.

An aqueous feed solution containing radium salts, such as chlorides for example, barium salts, and sodium salt of ethylene diamine tetra acetic acid, sold under the trade mark Versene, is continuously introduced into a middle zone of column 10 through line 11 at a rate controlled by means of valve 12. Instead of Versene, there may be employed other complex ion forming agents such as the sodium or other soluble salts of glutaric, citric and tartaric acid and water soluble derivatives thereof. The pH value of the feed solution is maintained on the acid side of the scale, preferably in the range of about 5 to 6 pH. Hydrochloric acid may be added to the feed solution if necessary, to attain the desired value. The concentrations of the various components in the feed solution may vary over wide limits but are usually between about a trace up to about two equivalents per liter of total ionic material. The barium to radium weight percent ratio in the feed liquid may vary widely, say from about 200,000 to 1 downwards. The molar concentration of the Versene in the feed liquid may vary between about .05 to .3 molar.

A cation exchange resin, preferably in the monovalent form, such as in the sodium form, is continuously introduced into the top of column 10 through line 13 at a predetermnied rate. Normally this resin is regenerated material to which is added a small proportion of fresh make-up resin. The resin is in the form of particles such as beads, pellets, granules, etc., preferably in the size range of about 10 to 100 U.S. mesh. In general, however, free-flowing solids are satisfactory.

The resin descends continuously as a porous bed by gravity through column 10 while it is continuously contacted countercurrently by the rising feed solution which moves through the interstices of the resin particles in the moving bed. During this contacting, a cation exchange takes place between the resin and the feed solution whereby the resin adsorbs mostly radium ions and some barium ions from the feed solution and releases to the solution usually hydrogen ions or alkali metal ions. As the resin particles approach the inlet zone at line 11, they are substantially at equilibrium with the surrounding liquid in respect to the adsorption of radium ions therefrom. Upon passing below the level of line 11, however, the resin particles come into contact with a much more concentrated radium ion solution.

This more concentrated radium ion solution is a used regeneration solution which will be described below. This used regeneration solution is continuously introduced into the bottom of column 10 through line 14. In column 10, this solution also rises through the downwardly moving resin bed. By virtue of the higher radium ion concentration in this solution, an additional amount of radium ion is adsorbed on the resin particles. This action causes a displacement of substantially all of the small amount of barium ion adsorbed on the resin. As a result, the resin reaching the bottom of column 10 is highly saturated with substantially pure radium ions. This resin is continuously withdrawn in the form of a slurry from the bottom of column 10 at a predetermined rate by means of rotary valve 15 through line 16 and is continuously fed into slurry tank 17.

The used regeneration solution, after passing above the level of line 11 in column 10, becomes mixed with the feed solution entering the column through line 11 and the resulting mixture passes upward through the interstices of the descending resin bed in column 10. As the resulting mixture of solutions approaches the level of outlet line 18, leading from column 10, substantially all of the radium ion content has been removed from the solutions and has been adsorbed on the descending resin bed. The resulting mixture of solutions containing barium ions and Versene is continuously withdrawn from column 10 through line 18, and may be discharged to waste or to systems for the recovery of barium and Versene.

Radium-rich resin slurry is continuously pumped from slurry tank 17 through slurry lift leg 19 and into dewatering drain 20, by means of an air-lift pump as indicated. Compressed air is introduced into tank 17 through valved line 21 and line 22, respectively. As the slurry enters drain 20 from the end of line 19, the air is disengaged and passes into the atmosphere while the slurry enters drain 20. In dewatering drain 20, the used regeneration solution is separated from the slurry, and recirculated to slurry tank 17 through dewatering return leg 23 to produce in tank 17 a slurry of the desired fluidity for pumping by means of the air-lift pump. Occluded radium-rich used regeneration solution may be washed from the drained resin with small amounts of water by means not shown. These washings also are transferred to tank 17 through dewatering leg 23. The height of drain 20 above the top of column 10 is preferably made sufficient to form a seal to prevent feed solution from tending to flow out of the bottom of column 10. The radium-rich or exhausted resin is transferred from drain 20 into the top of column 25 through line 26.

A continuously descending resin bed is formed in column 25 due to the settling effect of gravity acting on the resin particles. Simultaneously, a stream of fresh regeneration solution is introduced into the bottom of column 25 through line 27 at a continuous rate controlled by means of valve 28. The fresh regeneration solution rises continuously through the interstices of the downwardly moving bed of radium-rich resin, and efficiently displaces the radium ions from the resin during its countercurrent contacting of the resin particles in the bed.

The regeneration solution is an aqueous solution of Versene of substantially the same Versene concentration as the feed solution, but is at a higher pH, preferably about 8 or above. The pH of the solution may be maintained at the desired value by the addition of sodium hydroxide thereto, if this proves necessary. During the displacement operation in column 25, sodium ions from the fresh regeneration solution are adsorbed on the resin particles and adsorbed radium ions are displaced from the resin and transferred to the fresh regeneration solution. Thus the regeneration solution is gradually enriched as it moves toward outlet line 29 near the top of column 25.

As the resin particles move toward the bottom of column 25, substantially all of the adsorbed radium ions are replaced by sodium ions and the resin is completely regenerated. This regenerated resin is continuously withdrawn from the bottom of column 25 in the form of a slurry through line 30 at a rate controlled by rotary valve 31 and is discharged into slurry tank 32.

From slurry tank 32 the regenerated resin slurry is pumped into dewatering drain 33 through slurry lift leg 34 by means of an air lift pump supplied with air through valved line 35. In drain 33 air is disengaged from the slurry and passes into the atmosphere; most of the liquid in the slurry is separated from the resin component and is returned to tank 32 through dewatering return leg 36. Just before the separated regenerated resin passes out of drain 33 it may be washed with small amounts of water to free it of occluded radium-containing solution by means not shown. These washings also are transferred to tank 32 through leg 36. Finally the regenerated resin is transferred continuously from drain 33 into the top of column 10 through line 13 to commence a new cycle through the system.

As the radium-rich used regeneration solution reaches the top of column 25, it is continuously withdrawn through line 29. A portion of this regeneration solution, usually a major portion, is separated from the main stream in line 29 and passed into pH adjustment tank 37 where the pH of this solution, which is about 8 or above, is adjusted approximately to the pH value of the original feed solution, that is, in the range of about 5 to 6 pH by the addition of a controlled amount of acid, such as concentrated hydrochloric acid to tank 37 through valved line 24. This is accomplished by adding acid, preferably concentrated hydrochloric acid, to the regeneration solution until the desired pH, as measured by a suitable meter, is achieved.

This pH adjusted radium-rich, used regeneration solution is continuously transferred from tank 37 into the bottom of column 10 through lines 38 and 14 with the aid of pump 39. As previously pointed out, this solution rises through the downwardly moving resin bed in column 10, and an additional amount of radium is adsorbed on the resin as adsorbed barium is substantially completely displaced from the resin. This important step in the process of the invention results in the production, from a given feed solution, of a product solution having a much higher radium ion concentration of a given purity and at a given overall process radium recovery than is obtained by conventional chromatographic ion-exchange processes or the conventional fractional crystallization methods.

The radium concentrate product solution, which is the remaining unrecirculated portion of the used regeneration solution obtained from the top of column 25 through line 29, is continuously recovered from the system through line 40. The radium salt can be recovered from this solution by any suitable method. For example, the Versene may be precipitated and the radium salt recovered by evaporating the resulting solution to dryness. Alternatively, by way of example, the product solution may be acidified to a pH of about 5 by use of a strong, vaporizable acid, and then contacted by an acid form of a cation-exchange resin to adsorb radium ion on the resin. The resin may then be water-washed and the radium ion may finally be displaced from the resin by contacting the resin with a solution of a strong, vaporizable acid to produce a pure aqueous acid solution of radium salt. The pure, dry radium salt is obtained by evaporating the resulting aqueous solution to dryness. The continuous ion-exchange method of the present invention may be used for this latter method of recovering radium from the product solution, but any other suitable method may be used.

The operation of the ion-exchange resin may be explained as follows: When the feed solution containing radium and barium ions is brought into equilibrium with the cation exchange resin in the sodium or hydrogen form in column 10, the radium ions are selectively adsorbed in preference to the barium ions in the solution. At equilibrium a given amount of radium and barium will be adsorbed on the resin depending largely upon the concentration of these ions in the feed solution. When the used regeneration solution, which is much richer in radium ion concentration and much leaner in barium ion than the feed solution, is recirculated through the used resin in the lower portion of column 10, as described above, more radium ion is adsorbed on the resin and nearly all the adsorbed barium ion is displaced from the resin. This results in a great increase in the radium to barium ratio in the radium concentrate product solution.

This additional enrichment effect is produced on the resin and in the product solution because the adsorbed barium ions are selectively displaced from the used resin in the lower portion of column 10 by the acidified Versene or used regeneration recycle solution. These displaced barium ions will be moved upwardly chromatographically on the moving resin bed in column 10. The similarly displaced radium ions will also move upwardly in this manner but at a much slower rate, which is made to be less than that of the downward movement of the resin bed so that a net downward movement of the radium ions results while a net upward movement of the displaced barium ions takes place.

These respective movements of the radium and the barium ions is accomplished because readsorption of barium ions on the moving resin bed takes place much more slowly than the readsorption of radium ions on the same bed.

Thus the chromatographic separation of radium ions from barium ions in the present method takes place in the upper portion of the moving resin bed above the level of the liquid feed inlet while at the same time a partial displacement and differential readsorption takes place in the lower portion of the resin bed. These two effects are, of course, not maintained separate and independent of each other, but are superimposed upon each other so as to complement each other and produce a much more efficient separation of radium ions from barium ions than is possible by normal chromatographic methods alone.

The present method is not only applicable to the recovery of radium from radium-barium mixtures but is applicable to recovery of radium from mixtures containing strontium, calcium, magnesium, sodium and other ions alone or in admixture with each other, in addition to barium ions.

Another embodiment of the method of the invention is presented with reference to Figure 2 of the accompanying drawings, which diagrammatically illustrates a batch-continuous method as distinguished from a continuous method. The rectangles in Figure 2 represent vessels in which resin and solution are agitated until equilibrium between resin and solution is approached. The mixture of resin and solution is then settled and the resin is moved one stage to the right while the solution is moved one stage to the left. An eight-stage system is illustrated, but more than eight stages, or less, may be used as desired. The total number of stages chosen and the number employed in each of the three sections of the system will depend upon, among other things, the feed material employed and the degree of separation and recovery desired.

In describing this system it will be assumed that it has been in operation, that it has reached a steady state, and that the contents of all of the vessels have been completely settled. The resin and solution of each stage are separated and material transfers are then made as follows: The solution settled in vessel 1 is discarded as barium waste solution; the resin from stage 1 and the solution from stage 3 are introduced into vessel 2; the resin from stage 8, or a measured amount of a cation exchange resin, preferably in the monovalent form, and the solution from stage 2 are introduced into vessel 1; the resin from stage 2 and the solution from stage 4 are placed in vessel 3; the resin from stage 3 and the solution from stage 5 are introduced into vessel 4 together with a measured amount of an aqueous feed solution of radium and barium salts and Versene, for example; the resin from stage 4 and the solution from stage 6 are introduced into vessel 5; the resin from stage 5 and a portion (usually a major portion) of the solution from stage 7 are introduced into vessel 6 together with a sufficient amount of a pH adjustment solution (such as concentrated hydrochloric acid) to adjust the pH of the mixture in vessel 6 to a pH approximately equal to that of the radium-barium feed solution mentioned above, that is, a pH in the range of about 5 to 6. Simultaneously, the remaining portion of the solution from stage 7 is withdrawn from the system as radium concentrate product; the resin from stage 6 and the solution from stage 8 are introduced into vessel 7; and the resin from stage 7 and a measured amount of fresh regeneration solution, which is an aqueous solution of substantially the same Versene concentration as the feed solution, but of a higher pH, such as about 8 or above, are introduced into vessel 8.

After all of these transfers have been made, the contents of each of the eight vessels are agitated until equilibrium is approached in each case with respect to the radium content of the resin and the solution. The solids-liquid suspensions in each of the vessels are permitted to settle, and the resin and solution transfers described above are repeated. The cycle of operations, consisting of material transfers, mixing, and settling, are repeated, as described, to produce from the feed solution a barium waste solution of substantially zero radium content and a radium concentrate product substantially free of barium and of a much higher degree of radium concentration than that of the feed solution.

The batch-continuous method of operation of Figure 2 and the continuous operation of Figure 1 are quite similar. The ion-exchange operations conducted in vessels 1 to 4 of Figure 2 correspond to those performed in the upper half of column 10 of Figure 1, those conducted in vessels 5 and 6 of Figure 2 correspond to those conducted in the lower half of column 10 of Figure 1, and those conducted in vessels 7 and 8 of Figure 2 correspond to those conducted in column 25 of Figure 1. The principal differences between the two methods of operation are largely differences in degree due to the semi-continuous character of the method shown in Figure 2 as compared to the continuous nature of the method shown in Figure 1.

The following specific example more clearly illustrates the operation and results obtainable from the batch-continuous modification of the present invention:

*Example*

A dilute aqueous solution which was 0.15 molar in Versene and contained $3480 \times 10^{-9}$ grams of radium ion and 10 grams of barium sulfate per 500 ml. was used as the feed material. The solution was adjusted to a pH of 5.7 with hydrochloric acid. Batches of 500 ml. of the feed solution just described were added to vessel 4 (Figure 2) at the beginning of each cycle, after each resin-solution separation was made. At the same time, about 4 grams of fresh or regenerated resin, Dowex 50 (a sulfonic acid type cation exchange resin), was added to vessel 1, barium waste solution was separated from vessel 1 and discarded from the system, about 100 ml. of fresh regeneration solution of pH 10 and 0.15 molar in Versene was introduced into vessel 8, small amounts of concentrated hydrochloric acid were added to vessel 6 for pH adjustment to about 5.7 pH, and about 70 ml. of radium concentrate product solution was withdrawn from the solution separated from vessel 7. After equilibrium conditions were established, a realtively high concentration of radium, as well as a very satisfactory radium recovery were obtained from this relatively simple system.

The composition and properties of Dowex 50 cation exchange resin are described in an article, submitted by Dow Chemical Co., in vol. 69, November 1947, pages 2830–2836, of the Journal of the American Chemical Society. Dowex 50 is stated to be an aromatic hydrocarbon polymer of the type described by D'Alelio in U.S. Patent No. 2,366,007 which was issued on December 26, 1944. Such resin is stated to contain nuclear sulfonic acid groups as the sole ion active group at any pH value.

A wide variety of original radium containing ores may be treated by the method of the present invention to recover radium. In commercial practice these ores are processed in various ways in both physical and chemical operations depending upon the constituents of the original ore, to produce a more or less refined radium concentrate. Undesirable ionic materials, which interfere with the adsorption of radium on the cation-exchange resin are eliminated as much as possible from the radium concentrate by appropriate means. The radium concentrate is usually obtained in the form of a dilute aqueous solution containing large amounts of chloride (or bromide) alkaline earth and alkali metal ions, and small amounts of other ionic material, including the desired radium ions. A complexing agent may then be added but is not necessary for satisfactory operation of the present processing method. Finally, the concentration and the pH value of the solution are adjusted to the desired values by the addition of water and concentrated mineral acid.

The purpose of the complexing agent, or complex ion forming agent, is to form chelates of barium ions in preference to chelates of radium ions in the pH range of about 5 to 6. Thus the adsorption of radium on a resin which selectively adsorbs radium ions in the presence of barium ions is enhanced by the presence of Versene which sequesters or complexes the barium ions in preference to the radium ions in the feed solution at the chosen adsorbing conditions by producing a lower ratio of barium ions to radium ions.

The ion-exchange materials employed for the recovery of radium from solutions comprise cation-exchange adsorbents in which the cations of the adsorbent are exchanged for the positively charged radium ions in the feed solution. The process is particularly effective when the adsorbent used is an inert organic material containing free sulfonic acid groups. For example, poly-vinylaryl resins, phenol-formaldehyde resins, lignite and phenoltannic acid resins containing numerous $R-SO_3-M$ groups in which R is an organic group and M may be hydrogen or a metal ion, preferably a sodium ion.

The method of the invention may be employed for the separation of anions or anionic material from solutions by the use of anion-exchange substances. Examples of these operations are the deionization of water and the recovery of fresh water from sea water. Anions such as chloride ion, sulfate ion as well as nitrate ion and many others may be separated from aqueous solution by the choice of appropriate anion-exchange resins or materials by using the method of the present invention. Furthermore, the method of the invention may be employed in processing nonaqueous solutions, employing solvents such as methanol, ethanol, acetone, dioxane, benezene, hexane, and other organic liquids as well as mixed aqueous and nonaqueous solvents.

Obviously there are other applications and modifications of the process of the present invention than those mentioned above. It is to be understood, therefore, that the scope of this invention is to be determined only as required by the following claim when construed in the light of the prior art.

What is claimed is:

A continuous process for separating radium ions from an aqueous solution containing radium ions and barium values containing less than about two gram equivalents of ionic material per liter and having a pH value of about 5 to 6 and .05 to .3 mole per liter of the sodium salt of ethylenediamine tetraacetic acid as complexing agent, which comprises countercurrently contacting, in an exchange zone, a cation exchange resin having a particle size in the range 10 to 100 U.S. mesh with said feed solution until the resin becomes relatively saturated with radium ions, said resin having sulfonic acid groups and being a member of the group consisting of polyvinyl-aryl resins, phenol-formaldehyde resins, lignite and phenoltannic acid resins, and their alkali metal derivatives, passing the relatively saturated resin to a regeneration zone, contacting the relatively saturated resin in said regeneration zone with a fresh regeneration liquid having a pH value of about 8 and containing said complexing agent to form a used regeneration liquid containing a higher concentration of radium ions than the feed solution, adjusting a portion of the used regeneration liquid to a pH in the range of about 5 to 6, recirculating the pH-adjusted portion of the used regeneration liquid in continuous countercurrent contact with the relatively saturated resin in said exchange zone at a point between the entry of the feed solution and the exit of the resin from such exchange zone, removing depleted feed and depleted spent regenerant from said exchange zone together and recovering the remaining portion of said used regeneration liquid as the radium-enriched product.

References Cited in the file of this patent

UNITED STATES PATENTS

| | | |
|---|---|---|
| 1,120,551 | Schwerin | Dec. 8, 1914 |
| 2,366,651 | Rawlings | Jan. 2, 1945 |
| 2,413,791 | Shafor | Jan. 7, 1947 |
| 2,554,649 | Tompkins | May 29, 1951 |

OTHER REFERENCES

Selke et al.: Chemical Engineering Progress, vol. 47, pages 529–533 (1951).

Tompkins, in "Chemical Abstracts," vol. 43, col. 2090(d), 1949.

Vermeulen et al. in "Chemical Abstracts," vol. 46, cols. 4860(g) to 4861, June 10, 1952.